US012656231B2

(12) United States Patent
York et al.

(10) Patent No.: US 12,656,231 B2
(45) Date of Patent: *Jun. 16, 2026

(54) REFRACTIVE INDEX MATCHING FORMULATIONS

(71) Applicant: LIFE TECHNOLOGIES CORPORATION, Carlsbad, CA (US)

(72) Inventors: Adam York, Eugene, OR (US); Eric Welch, Eugene, OR (US); Daniel Cash, Eugene, OR (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,906

(22) Filed: Apr. 16, 2024

(65) Prior Publication Data

US 2024/0272049 A1 Aug. 15, 2024

Related U.S. Application Data

(63) Continuation of application No. 16/641,193, filed as application No. PCT/US2018/050392 on Sep. 11, 2018, now Pat. No. 11,988,585.

(60) Provisional application No. 62/557,028, filed on Sep. 11, 2017.

(51) Int. Cl.

| | |
|---|---|
| *G01N 1/36* | (2006.01) |
| *C08K 3/30* | (2006.01) |
| *C08K 5/09* | (2006.01) |
| *G01N 1/30* | (2006.01) |
| *G02B 21/34* | (2006.01) |

(52) U.S. Cl.
CPC ................. *G01N 1/36* (2013.01); *C08K 3/30* (2013.01); *C08K 5/09* (2013.01); *G01N 1/30* (2013.01); *G01N 2001/364* (2013.01); *G02B 21/34* (2013.01)

(58) Field of Classification Search
CPC ... C08K 5/053; G02B 21/33; G01N 2001/364
See application file for complete search history.

(56) References Cited

U.S. PATENT DOCUMENTS

| | | | | |
|---|---|---|---|---|
| 4,857,312 | A * | 8/1989 | Hegasy ................. | A61K 9/006 |
| | | | | 514/344 |
| 5,104,640 | A * | 4/1992 | Stokes .................... | G01N 1/30 |
| | | | | 435/40.51 |
| 5,492,837 | A * | 2/1996 | Naser-Kolahzadeh | ..................... |
| | | | | G02B 21/34 |
| | | | | 435/40.52 |
| 11,988,585 | B2 * | 5/2024 | York ....................... | C08K 5/09 |
| 2014/0264994 | A1 | 9/2014 | Glenn, Jr. et al. | |
| 2017/0016808 | A1 | 1/2017 | Simon et al. | |
| 2017/0167956 | A1 | 6/2017 | Key et al. | |

FOREIGN PATENT DOCUMENTS

| | | |
|---|---|---|
| GB | 2114291 A | 8/1983 |
| GB | 2419425 A | 4/2006 |
| JP | S5162839 A | 5/1976 |
| JP | S55104311 A | 8/1980 |
| JP | 2001125006 A | 5/2001 |
| JP | 2009031688 A | 2/2009 |
| JP | 2012533090 A | 12/2012 |
| WO | WO-9630738 A1 | 10/1996 |
| WO | WO-2009086487 A2 | 7/2009 |
| WO | WO-2013155064 A1 | 10/2013 |

OTHER PUBLICATIONS

Ravikumar, S., et al., Mounting Media: An Overview, Journal of Dr. NTR University of Health Sciences 2014: 3(Supplement-1): S1-S8 (Year: 2014).*
International Search Report and Written Opinion for Application No. PCT/US2018/050392, mailed Dec. 21, 2018, 13 pages.
Sigma-Aldrich Mowiol (R) 4-88 Product Data Sheet, 2023, 10 pages.
Sp2 Technical Data Sheet: Poly (vinyl alcohol), 98% hydrolyzed, 1 page. (Undated).

* cited by examiner

*Primary Examiner* — Fred M Teskin
(74) *Attorney, Agent, or Firm* — Caroline D. Belt

(57) ABSTRACT

Refractive index matching (RIM) formulations, their use for mounting biological specimens (e.g., cells and tissues) to a substrate, and methods of visualizing biological specimens embedded in RIM formulations are described.

17 Claims, 3 Drawing Sheets

REFRACTIVE INDEX MATCHING FORMULATIONS

CROSS-REFERENCE TO RELATED APPLICATIONS

This application is a continuation application of U.S. application Ser. No. 16/641,193, filed Feb. 21, 2020, now, U.S. Pat. No. 11,988,585, which is a 371 National Stage Application and claims priority to PCT/US2018/050392 filed Sep. 11, 2018, which claims priority to U.S. Application No. 62/557,028, filed Sep. 11, 2017, which disclosures are herein incorporated by reference in their entirety.

TECHNICAL FIELD

Refractive index matching (RIM) formulations, their use for mounting biological specimens (e.g., cells and tissues) to a substrate, and methods of visualizing biological specimens embedded in RIM formulations are described.

BACKGROUND

Biological specimens often are mounted on an optically clear substrate, such as a glass microscope slide, for examination by light microscopy. Typically, the mounting process involves suspending a biological specimen (e.g., a fixed cell or tissue) in a mounting solution, also referred to as a "mounting medium" or "mountant," and then depositing the specimen onto the surface of the substrate, thereby embedding the specimen in the mounting solution. The mounting solution and embedded specimen are optionally dried prior to interrogation, typically under a cover slide. The mounting medium protects the specimen from physical damage and allows for extended storage of the specimen.

The selection of a mounting medium is dictated by the type of sample and substrate. The mounting medium can be liquid or can harden into a permanent mountant. In addition, the mounting media ideally does not react with the specimen and does not crystallize or darken over time. If the specimen is stained with a dye, the mountant also should not cause the dye to fade or bleach. For biological specimens that are labeled with fluorescent dyes, selection of a suitable mountant often is governed by its ability to minimize photobleaching. A suitable mountant should effectively reduce photobleaching of the fluorophores, while minimizing quenching of the initial fluorescence intensity. Loss of fluorescence through irreversible photobleaching can lead to a significant reduction in sensitivity, particularly when target molecules are of low abundance or when excitation light is of high intensity or long duration. Another factor in the selection of an appropriate mountant is its optical clarity. Optical clarity is influenced not just by how clear a mountant is, but by how well the refractive index (RI) of the mountant, sample, and glass or other substrate are matched. For biological specimens, an aqueous mounting medium is generally chosen. However, commercially available, aqueous mounting media fail to adequately match the refractive index of the specimen. For example, cells and tissue typically have a RI of 1.35-1.42. Because the RI of these mounting media fall below the RI of the glass used in microscope slides and coverslips (1.50-1.54) and also do not match the RI of the biological specimens, these mounting media do not permit for optimal optical clarity. Thus, there is a need for improved formulations for mounting biological specimens that have a RI that more closely matches the RI of glass and/or the biological specimen under interrogation.

SUMMARY

Refractive index matching (RIM) solutions are provided that include a water-soluble polymer, wherein the polymer has a molar refraction ($R_{LL}$) to molar volume ($V_m$) ratio of 0.27 to 0.34, and a polyol. In one aspect, a refractive index matching (RIM) solution is provided that includes a water-soluble polymer, wherein the polymer has a molar refraction ($R_{LL}$) to molar volume ($V_m$) ratio of 0.27 to 0.34; and a polyol, wherein the weight ratio of the water-soluble polymer to the polyol is 0.125:1 to 4:1. In certain embodiments, the weight ratio of water-soluble polymer to polyol is 0.318:1 to 4:1. The RIM solution can further include water or a buffer. The RIM solution can have a refractive index (RI) of 1.33 or greater (e.g., 1.333 to 1.530; or 1.330 to 1.420). In certain embodiments, the RI of the RIM solution is 1.36 or greater. In certain embodiments, the RI of the RIM solution is 1.38 or greater. In yet other embodiments, the RI of the RIM solution is 1.47 or greater. Typically, the RI of the RIM solution is 1.60 or less.

In another aspect, a method of mounting a biological specimen on a substrate is provided that includes depositing the biological specimen on the substrate; and contacting the biological specimen with the RIM solution disclosed herein to provide a mounted sample. In any of the methods, mounted biological specimens or kits described herein, the substrate can be a microscope slide, cuvette, well, imaging chamber or dish. Representative examples of biological specimens include a cell, tissue, 3D cell culture (e.g., spheroid/organoid), or a whole organism (e.g. fruit fly, worm, zebra fish). Optionally, the biological specimen is labeled with a fluorescent dye or fluorescent protein. The method can further include drying the mounted sample, whereby the water-soluble polymer solidifies to provide a solidified polymer. The water-soluble polymer can solidify in about 48 hours or less; or 24 hours or less at room temperature; or in about 4 hours or less at a temperature of about 40° C. The RI of the solidified polymer can exceed 1.47. In certain embodiments, the RI of the solidified polymer is 1.48 to 1.54. In specific embodiments, the RI of the solidified polymer is 1.50 to 1.525. The method can further include visualizing the biological specimen on the substrate with a microscope.

In yet another aspect, a solidified mountant is provided that includes a water-soluble polymer, wherein the polymer has a molar refraction ($R_{LL}$) to molar volume ($V_m$) ratio of 0.27 to 0.34, and a polyol, wherein the weight ratio of the water-soluble polymer to the polyol is 0.125:1 to 4:1. The weight ratio of the water-soluble polymer to the polyol in the solidified mountant can be 0.5:1 or greater. The solidified mountant can have a refractive index of 1.47 or greater. In some embodiments, the refractive index of the solidified mountant is greater than 1.47. In certain embodiments, a solidified mountant is provided that includes a water-soluble polymer, wherein the polymer has a molar refraction ($R_{LL}$) to molar volume ($V_m$) ratio of 0.27 to 0.34, and a polyol, wherein the weight ratio of the water-soluble polymer to the polyol is 0.318:1 to 4:1, and wherein the solidified mountant has a refractive index of 1.48 or greater. The RI of the RIM solutions or solidified mountants disclosed herein are ideally suited to match the refractive index of soda-lime glass, borosilicate glass, or immersion oil (e.g., 1.48-1.50; or 1.50 to 1.52; or 1.52 to 1.54).

The water-soluble polymer used in the disclosed formulations can be uncharged. For example, the uncharged, water-soluble polymer can be a poly(acrylamide), poly(methacrylamide), poly(methyl vinyl ether), poly(vinyl pyrrolidone) (PVP), polyvinyl alcohol (PVA), poly(2-ethyl-2-oxazoline), or poly(2-methyl-2-oxazoline). In certain embodiments, the uncharged, water-soluble polymer includes a monomer residue of N—R acrylamide or N—R methacrylamide, wherein R is methyl, ethyl, propyl, isopropyl or H; N,N-dimethylacrylamide, N,N-dimethylmethacrylamide, N,N-diethylacrylamide, N, N diethylmethacrylamide; N-2-hydroxypropyl methacrylamide); or a combination thereof. In certain embodiments, the uncharged, water-soluble polymer is poly(N-methyl methacrylamide) (PMMAm). Alternatively, the water-soluble polymer used in the disclosed formulations can be charged. Representative charged, water-soluble polymers include, e.g., polyacrylic acid, polymethacrylic acid, poly(diallyldimethylammonium chloride), poly(sodium-4-styrenesulfonate), poly(ethyleneimine), poly(N,N-dimethylaminoethyl acrylate), poly(N,N-diethylethylamino acrylate), poly(allylamine), poly[bis(2-chloroethyl)ether-co-1,3-bis[3-(dimethylamino)propyl] urea]; or poly(vinylsulfonic acid, sodium salt). In certain embodiments, the water-soluble polymer is not a polyol. The water-soluble polymer can have a weight average molecular weight of about 1 kDa to about 100 kDa. In certain embodiments the weight average molecular weight is about 1 kDa to about 20 kDa; or about 20 kDa to about 100 kDa; or about 48 kDa to about 80 kDa. The water-soluble polymer also can be a copolymer formed from two or more of the charged or uncharged monomers described herein, where the copolymer can be, e.g., a random, gradient, block or graft copolymer.

The mounting formulations disclosed herein also can include a polyol such as polyvinyl alcohol, glycerol, diglycerol, polyglycerol, mannitol, sorbitol, erythritol, thiodiethanol, thiodipropanol, or a combination thereof. Optionally, the formulations can further include an anti-oxidant (e.g., about 1% by weight or less), such as, e.g., 6-hydroxy-2,5,7,8-tetramethylchroman-2-carboxylic acid, 3-carboxy proxyl, hydroquinone, mequinol, sodium sulfite, sodium erythorbate, ascorbic acid, propyl gallate, caffeic acid, para-phenylenediamine, 1,4-diazabicyclo[2.2.2]octane, or a combination thereof.

In yet another aspect, a mounted biological specimen is provided that includes a biological specimen disposed on a substrate, wherein the biological specimen is embedded in a solidified mountant, as disclosed herein.

In yet another aspect, a kit for mounting a biological specimen on a substrate is provided that includes a refractive index matching (RIM) solution, as disclosed herein; and instructions for mounting the biological specimen on the substrate.

DETAILED DESCRIPTION

Figure 1:
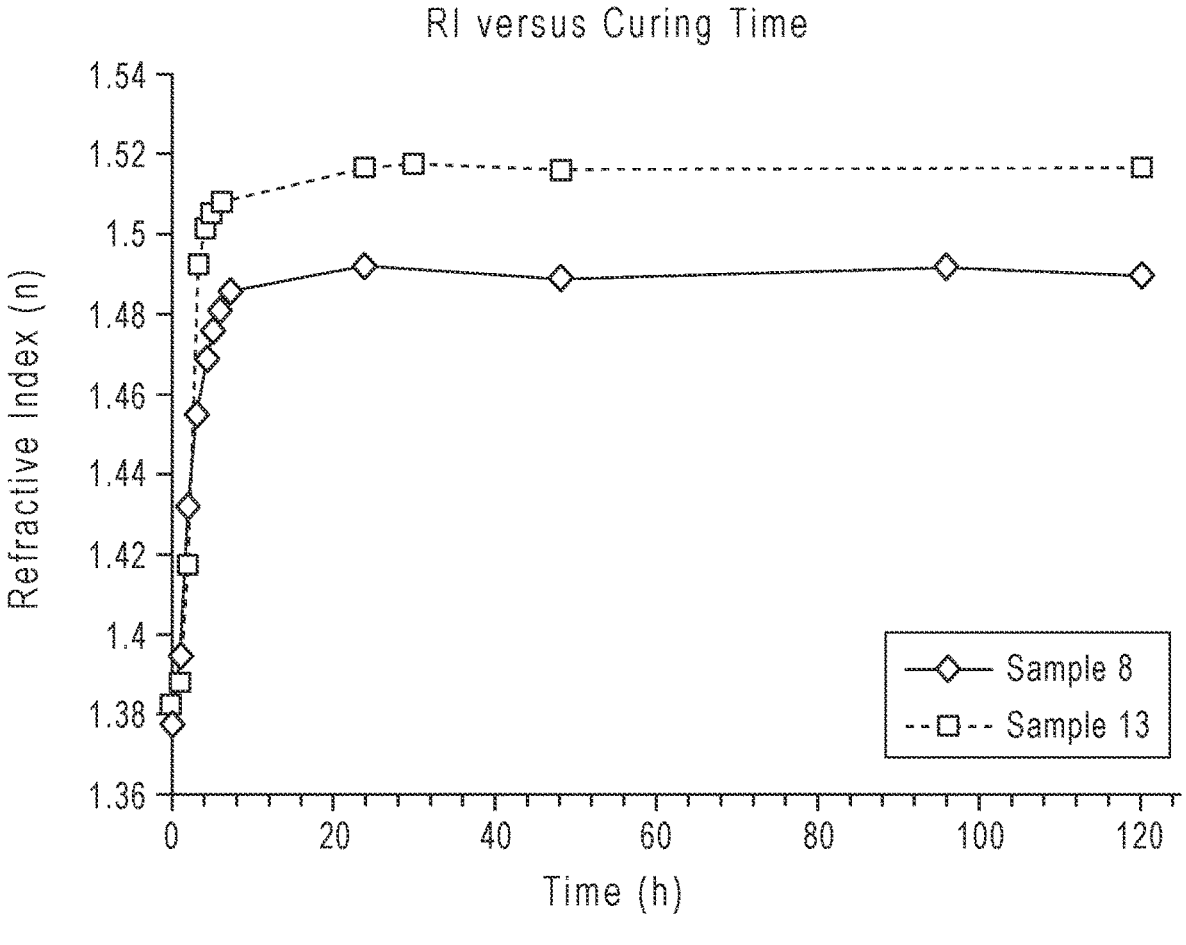
FIG. 1 is a plot showing the refractive index change as a function of time for Sample 8 and 13.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, the term "about", when used to describe a numerical value, encompasses a range up to +15% of that numerical value, unless the context clearly dictates otherwise.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

"Refractive index" or "RI," as used herein, is a measure of how fast light travels through a particular medium. When light travels between two media with different RI values, such as air and water, the path that it travels is bent, distorting the image. Refractive index also is a measure of how much the speed and the wavelength of radiation are reduced with respect to the wavelength of the light in a vacuum. Because RI is a ratio of two velocities, it is dimensionless.

"Water-soluble" is used herein to mean the compound can be soluble or dispersible in an aqueous-based solution, such as in water or water-based solutions or buffer solutions, including those used in biological or molecular detection systems as known by those skilled in the art. A compound is considered water-soluble if it can be dissolved in an aqueous formulation at a concentration of 10 mg/mL or more. Compounds that can be dissolved in an aqueous system at a concentration of 100 mg/mL or greater are considered highly water-soluble. Compounds that can be dissolved in an aqueous system at a concentration of 1 mg/mL or less are considered to have poor water solubility.

"Biological specimen" or "biological sample," as used herein encompasses hematological, cytological and histological specimens, such as cells, 3D cell cultures (e.g. spheroids and organoids), tissues, whole organisms (e.g. flies, worms, zebrafish), cell-free extracts, or a fluid sample (e.g., blood or sputum). A tissue specimen can be any type of nervous, epithelial, muscular, and connective tissue, including an organ tissue. Biological samples can be from a plant or animal (e.g., human, mouse, fly, worm, fish, frog, fungi, and the like).

Formulations for use in mounting a specimen on a substrate are described herein. The described formulations are aqueous-based systems that provide a hard-setting mounting medium for protection and storage of the specimen. The formulations can be applied directly to cells and tissue samples, which optionally can be fluorescently labeled, on a substrate and can harden upon drying. Formulations can harden without a coverslip, thus eliminating the requirement that a cover slip be used to protect the mounted specimen. The mounting formulations disclosed herein hold the specimen in place on the substrate, thereby stabilizing and preserving the biological specimen on the substrate for subsequent interrogation. For example, once mounted, the biological specimen can be imaged under a microscope. The disclosed formulations have favorable optical characteristics that make these formulations ideal for use as a mounting medium for biological samples. In particular, the disclosed formulations exhibit a high refractive index. It is known that the RI of the specimen and mounting medium can significantly impact image quality. For example, the difference between the RI of the specimen and the surrounding mountant can influence how the specimen appears under a microscope. If the difference between the RI of the specimen and the surrounding medium is large, strong refraction of light at the specimen and mounting medium interface can occur. A large difference in RI can cause artifacts as light is refracted that can obscure details of the specimen. In contrast, small differences in RI between the specimen and the mounting medium can reduce light refraction, making many types of specimens appear brighter and/or more transparent under the microscope.

Provided herein are formulations that can match the refractive index of a biological sample, as well as substrates, lens, coverslips, and other components commonly used in microscopy. Thus, the formulations described herein have a refractive index (RI) that matches the RI of the glass of the objective lens of the microscope, as well as the glass of the microscope coverslip or other components commonly used in microscopic imaging of samples such as immersion oil. By virtue of having high RI, the disclosed formulations minimize distortion of microscope image resulting from light refraction, making these formulations suitable for use under high magnification and/or with immersion oils, such as are typically used to minimize distortion of the microscope image. Once dried, the instant formulations have an RI that exceeds the RI of existing hard mount formulations, while reducing photobleaching of the sample and dyes, if present. For example, particular formulations described herein can have an RI of 1.47 or greater, which is significantly higher than standard hard-mount formulations known to those skilled in the art.

The formulations provided herein are optically clear, even once dried, are chemically compatible with the biological specimen and do not harm or degrade the biological specimen, even after prolonged storage. The described formulations also improve clarity of higher magnification and 3D reconstruction (Z-stack) images and can reduce spherical aberration or scattered light, thereby allowing for capture of clearer images at multiple depths. Due to the favorable physical and optical properties, the instant formulations can be implemented in three-dimensional imaging of various types of biological specimens (e.g., tissues and cells) using a range of microscope techniques such as those used for visualization of fluorophores at depth within a specimen (e.g., confocal fluorescence microscopy). Further, the disclosed formulations also exhibit low bubble formation, less shrinking than other commercially available hard set mountants upon drying and do not crack upon drying and/or freezing. The mountant does not discolor or shrink when cured, making it possible to take high quality images weeks or even months after mounting the slides. The formulations disclosed herein also can minimize quenching of fluorescent dyes commonly used in cellular imaging applications. Formulations that include anti-fade reagents, for example, can resist quenching of dyes and particularly useful for imaging cells and tissues stained with fluorescent probes. The unique combination of attributes described above makes the described formulations particularly useful for long term storage of stained, biological samples.

The refractive index matching (RIM) formulations provided herein can include one or more water-soluble components (e.g., a water-soluble polymer). The RIM formulations provided herein can include more than one watersoluble component. In certain embodiments, the formulation includes at least two water-soluble components. The watersoluble components can be contained in an aqueous medium, making the formulations suitable for use with biological specimens. The formulation containing the biological specimen can be imaged directly or dried prior to imaging to remove water from the formulation.

The RIM formulations provided herein exhibit a refractive index that matches the refractive index of substrates typically used in imaging applications (e.g., microscope slide, such as those made from soda-lime glass or borosilicate glass) or immersion oil. The RIM properties of the formulations described herein can improve image quality, making the described formulations ideal for use in imaging applications. RIM formulations provided herein exhibit an exceptionally high RI relative to standard mounting formulations known to those skilled in the art. Typically, the refractive index of the disclosed formulations once solidified exceeds 1.45. Surprisingly, the disclosed formulations can provide optically clear mounting formulations having a RI of 1.45 of greater. In certain embodiments, the RI of the mountant is 1.45 to 1.47. In other embodiments, mountants are provided with RI of 1.47 or greater (e.g., 1.47 to 1.50; or 1.50 to 1.52; or 1.52 to 1.54). In certain embodiments, the RI of the formulation is about 1.47 to about 1.53. In certain embodiments, the RI of the mountant is about 1.50 to about 1.52.

For biological samples, such as tissue, that exhibit a RI range from about 1.50 to 1.52, it can be desirable to utilize a formulation that can provide a cured mountant having the same RI range. Thus, suitable water-soluble components for use in the disclosed RIM compositions, once dried, typically have a RI of 1.45 or greater, e.g., 1.45 to 1.60. In some embodiments, the RI is 1.45 to 1.50. In other embodiments, the RI is 1.50 to 1.53. In other embodiments, the RI is 1.53 to 1.55. In yet other embodiments, the RI of the watersoluble components is 1.55 to 1.60. Typically, the RI of the solution used to prepare the mountant is slightly lower than that of the cured mountant. Thus, also provided herein is a RIM solution, wherein the RIM solution has a refractive index of 1.33 or greater (e.g., 1.333 to 1.530; or 1.330 to 1.420).

The water-soluble component(s) can be a water-soluble polymer. In certain embodiments, the formulation can further include a polyol. RI values for many types of polymers can be found in the literature. Where RI data is unavailable, the RI for a particular polymer can be measured or can be calculated based on Lorenz-Lorentz Theory using Equation 1, where n is the refractive index; and $R_{LL}$ and $V_m$ are the molar refraction and molar volume of the polymer repeat unit, respectively. The RI calculated from Equation 1 is wavelength dependent and typically is reported at a wavelength of 589 nm (sodium d-line).

$$R_{LL}/V_m = \left(n^2 - 1\right)/\left(n^2 + 2\right) \qquad \text{(Equation 1)}$$

$R_{LL}$ and $V_m$ values for numerous types of polymers can be found in the literature or estimated from group contribution effects using methods known to those skilled in the art. The $R_{LL}/V_m$ ratio for a water-soluble polymer suitable for use in a RIM formulation, as described herein, typically ranges from about 0.27 to about 0.34. In certain embodiments, a refractive index matching (RIM) formulation is provided herein that includes a water-soluble polymer, wherein the polymer has a molar refraction ($R_{LL}$) to molar volume ($V_m$) ratio of 0.27 to 0.34, such that the RIM solution has a refractive index from 1.45-1.60. In certain embodiments, formulations including a water-soluble polymer having a $R_{LL}/V_m$ ratio in the range from 0.284 to 0.314 provide RIM formulations having a refractive index from about 1.48 to about 1.54.

Water-soluble polymers and copolymers for use in the disclosed RIM formulations can be neutral or charged. For example, the water-soluble polymer can be a neutral (i.e., uncharged) polymer, such that it has minimal interaction with dyes and/or cellular proteins present in the sample. Exemplary neutral, water-soluble polymers include poly (acrylamide), poly(methacrylamide), poly(methyl vinyl ether), poly(vinyl pyrrolidone) (PVP), polyvinyl alcohol (PVA), poly(2-ethyl-2-oxazoline), and poly(2-methyl-2-oxazoline). Exemplary acrylamide and methacrylamide-based polymers can include residues of monomer units, such as, e.g., N—R acrylamide or N—R methacrylamide, wherein R is methyl, ethyl, propyl, isopropyl or H; N,N-dimethylacrylamide, N,N-dimethylmethacrylamide, N,N-diethylacrylamide, N, N diethylmethacrylamide, N-2-hydroxypropyl methacrylamide), or a combination of these monomer units. In certain embodiments, the uncharged, water-soluble polymer is poly(N-methyl methacrylamide) (PMMAm). Formulations including neutral polymers, such as, e.g., PMMAm, do not foam or form long-term air bubbles, as often occur with existing commercial hard mount formulations, and, therefore, can be pipetted onto a sample with very little risk of bubble formation. Formulations containing neutral polymers can cure in less than 24 hours, making such polymers particularly useful for the preparation of RIM solutions, as disclosed herein. For example, a formulation including PMMAm can solidify in approximately 3 hours to provide a cured mountant with an RI of 1.52.

Alternatively, the water-soluble polymer can be a charged polymer (e.g., a polyelectrolyte). Charged polymers can be more soluble in water and more viscous than neutral polymers of equivalent MW. Charged polymers, therefore, can have certain advantages when used in mounting formulations where such properties are desired. The charged polymer can carry a positive or negative overall charge. Exemplary charged, water-soluble polymers include polyacrylic acid, polymethacrylic acid, poly(diallyldimethylammonium chloride), poly(sodium-4-styrenesulfonate), poly(ethyleneimine), poly(N,N-dimethylaminoethyl acrylate), poly(N,N-diethylethylamino acrylate), poly(allylamine), poly[bis(2-chloroethyl)ether-co-1,3-bis[3-(dimethylamino)propyl] urea], or poly(vinylsulfonic acid, sodium salt).

The molecular weight of the water-soluble polymer can be chosen based on the desired properties of the mountant and its intended use. For example, the molecular weight of the polymer affects the viscosity of the formulation. Generally, the molecular weight is chosen to achieve a formulation that can be easily handled and yet sufficiently viscous such that it stays in place on the substrate. Polymers for use in the disclosed formulations typically include a range of molecular weights. The lower end of the molecular weight (MW) range can be selected based on the desired solubility of the polymer in the formulation, and the upper end of the MW range can be selected based on its ability to form a hardened surface upon drying. For example, if the MW is too low, then the formulations may not form a rigid film upon drying. In general, the water-soluble polymer can have a weight average molecular weight of about 1 kDa to about 100 kDa, e.g., 1 kDa to 15 kDa; or 15 kDa to 20 kDa; or 20 kDa to 40 kDa; or 40 kDa to 80 kDa; or 80 kDa to 100 kDa. In certain embodiments, the weight average molecular weight of the water-soluble polymer is about 48 kDa to about 80 kDa. Formulations that include a higher molecular weight polymer (e.g., greater than about 15 kDa can readily solidify under mild conditions that maintain the integrity of the biological specimen. In some embodiments, the RIM formulation can implement a lower molecular weight, water-soluble polymer (e.g., less than 20 kDa) to provide a softer, more viscous mountant. A softer mountant can provide certain advantages depending on the application and for mounting certain types of samples. For example, a softer mountant can be used with a specimen with thickness >200 microns, when there is a need to minimize extended drying times, or when recovery of the sample from the formulation is desired.

The RIM formulations can further include one or more polyols. A "polyol" refers to a compound that includes two or more hydroxyl groups. In certain embodiments, the polyol has 100 or more hydroxyl groups. In other embodiments, the polyol has 1000 or more hydroxyl groups. In certain embodiments, the polyol has 2500 or less hydroxyl groups. A polyol can be included in the formulation to help plasticize the RIM polymer, such that when the mounting film dries it does not become too brittle or start cracking. A polyol that does not evaporate also can provide some permanent volume to the film, thereby preventing the film from becoming too thin. Ideally, the dried film maintains a volume that is similar to the undried film. This can prevent deformation of a specimen due to shrinkage of dried material. Maintaining structure of the dried film is also important for sample archiving and storage at various temperatures (e.g. room temp, 4° C. and −20° C.). The polyol also should have a RI close to that of the biological specimen and/or substrate or other components in the mounted system (e.g., 1.46 to 1.60). In some embodiments, the RI is 1.47 to 1.54. Exemplary polyols include glycerol, diglycerol, polyglycerol, polyvinyl alcohol, sugars such as mannitol, sorbitol, erythritol, thiodiethanol, thiodipropanol, and the like. Typically, the polyol is different from the water-soluble polymer. However, it is contemplated that in certain formulations the polymer and polyol have the same composition. The molecular weights of the polymer and polyol can be the same or different. In a representative embodiment, e.g., PVA can be used as both the polyol and the water-soluble polymer, but the molecular weights of the two forms of PVA differ.

RIM formulations provided herein can include a combination of a water-soluble polymer and a polyol. The ratio of the water-soluble polymer to the polyol in the formulation can vary and can affect the refractive index of the dried hard mountant. Typically, formulations intended for preparation of a hard mountant include a weight ratio of water-soluble polymer to polyol of 0.125 or greater. In certain embodiments, the weight ratio of water-soluble polymer to polyol ranges from 0.125:1 to 4:1. In certain embodiments, the weight ratio of water-soluble polymer to polyol is; or 0.125:1 to 1:1; 1:1 to 2:1; 2:1 to 3:1; or 3:1 to 4:1. In certain formulations, the weight ratio of water-soluble polymer to polyol is 1:1 to 3:1. In certain formulations, the weight ratio of water-soluble polymer to polyol is about 0.5:1.

The RIM formulation can further include an aqueous component (e.g., water or a buffer), and the water-soluble polymer(s) and the polyol(s) are dissolved in the aqueous component. The aqueous component serves to dissolve and/or hydrate the biological specimen and components of the mounting formulation. Any biologically compatible buffer known to those skilled in the can be used in the formulations described herein, such as, e.g., Tris, PBS, borate, and the like. Buffers that maintain the pH of the formulation above 7.4 are especially useful in certain formulations, such as, e.g., when fluorescent dyes are present.

The described formulations can improve sample transparency without the need for an additional clearing agent. However, a clearing agent optionally can be used for imaging tissue samples to further improve image quality. Thus, in certain embodiments, the RIM formulations disclosed herein can be used in conjunction with a clearing agent. For samples including fluorescent materials, it can be preferable to implement aqueous clearing agents given their compatibility with many fluorophores and fluorescent proteins, as well as the instant RIM formulations. Exemplary clearing agents include, e.g., organic solvent-based and aqueous detergent-based reagents, glycerol or thioglycerol solutions, mono- and polysaccharides (e.g., fructose and sucrose), urea solutions, and commercially available reagents.

RIM formulations provided herein resist formation of precipitates, in contrast to commonly used mountants that are known to form precipitates on samples over the course of as little as 2-3 days. RIM formulations described herein also prevent the sample and/or fluorescent labeling materials, if present, from photobleaching. Formulations suitable for mounting and imaging biological specimens stained with a fluorescent dye optionally can further include an anti-fade reagent to minimize degradation or photobleaching of the stained sample upon storage or interrogation. Thus, in certain embodiments, the RIM formulations provided herein optionally include one or more antifade reagents and can be included in the RIM formulation at about 1 wt. % or less. Antifade reagents are well known to those skilled in the art and include anti-oxidants such as, e.g., 6-hydroxy-2,5,7,8-tetramethylchroman-2-carboxylic acid, 3-carboxy proxyl, hydroquinone, mequinol, sodium sulfite, sodium erythorbate, ascorbic acid, propyl gallate, caffeic acid, paraphenylenediamine, 1,4-diazabicyclo[2.2.2]octane], other nitroxides, or a combination thereof.

RIM formulations can further include additional components, such as, e.g., preservatives, to prevent degradation of the polymer and/or polyol during prolonged storage and/or to prevent or minimize bacterial growth. Suitable preservatives include those that do not absorb a significant amount of visible light or lower the RI of the formulation. Representative preservatives include, e.g., sodium benzoate, benzoic acid or sodium azide, and are typically present in the formulation of a concentration of less than 2% by weight. Additional components, such as dyes, also can be included in the RIM formulations provided herein. In certain embodiments, the RIM formulation can include a fluorescent dye for staining cells. In certain embodiments, the dye can stain the nucleus of a cell, such as, for example, Hoechst 33342 or DAPI.

Also provided herein are samples mounted on a substrate in a RIM mounting medium. For example, a biological specimen can be mounted on a substrate and embedded in a RIM formulation, as described herein. A substrate can be any material having a surface suitable for supporting or containing the RIM solution. For example, the substrate can have a surface that is smooth or rough and can be flat or contain a cavity or depression (e.g., a well for containing the formulation). In certain embodiments, the substrate has a relatively smooth and non-porous surface, such that RIM solution does not become absorbed into the substrate. Substrates can be optically transparent or non-tranparent, and can be made from a variety of materials, depending on the ultimate end use. For microscopy applications, e.g., the substrate can be optically transparent. Substrates can be made from any appropriate material, including, e.g., glass or a polymer. Representative substrates include but are not limited to those commonly used in optical and imaging applications such as, e.g., a microscope slide, cuvette, well, coverslip or dish. In certain embodiments, the mounted sample can includes a transparent substrate (e.g., a microscope slide), a biological specimen (e.g., tissue), and a solidified RIM formulation surrounding the sample and adhering it to the substrate. Optionally, a coverslip can be disposed over the solidified, mounted sample. The amount of solidified formulation on the mounted slide is sufficient to surround the biological specimen and adhere it to the substrate and/or coverslip.

Mounted biological samples, as disclosed herein, can be stable for many months (e.g., 5 months or more) when stored at room temperature or less without degrading or fading the sample or fluorescent stains, if present.

The sample can be any biological material including, but not limited to, tissues, cells, blood, and the like. The biological sample can be stained with a fluorescent dye(s) or fluorescent protein prior to mounting on the substrate. Fluorescent proteins suitable for staining biological samples are well known in the art and include, e.g., without limitation, GFP, RFP, mCherry, and the like. Commonly used fluorescent dyes for biological specimens include, e.g., boron dipyrromethenes (4,4-difluoro-4-bora-3a,4a-diaza-s-indacenes), cyanines, xanthenes, sulfonated pyrenes, rhodamines, coumarins, and derivatives thereof. Exemplary organic dyes include BODIPY dyes, coumarins (e.g., PACIFIC BLUE, PACIFIC GREEN and PACIFIC ORANGE (available from Thermo Fisher Scientific; Waltham, MA)), rhodamines, rhodol, fluorescein, thiofluorescein, aminofluorescein, carboxyfluorescein, chlorofluorescein, methylfluorescein, sulfofluorescein, aminorhodol, carboxyrhodol, chlororhodol, methylrhodol, sulforhodol; aminorhodamine, carboxyrhodamine, chlororhodamine, methylrhodamine, sulforhodamine, silicon rhodamine, and thiorhodamine, cyanine, indocarbocyanine, oxacarbocyanine, thiacarbocyanine, merocyanine, cyanines (e.g., cyanine 2, cyanine 3, cyanine 3.5, cyanine 5, cyanine 5.5, cyanine 7), oxadiazole derivatives, pyridyloxazole, nitrobenzoxadiazole, benzoxadiazole, pyrene derivatives, cascade blue, oxazine derivatives, Nile red, Nile blue, cresyl violet, oxazine 170, acridine derivatives, proflavin, acridine orange, acridine yellow, arylmethine derivatives, xanthene dyes, sulfonated xanthenes dyes, sulfonated pyrenes, auramine, crystal violet, malachite green, tetrapyrrole derivatives, porphyrin, phtalocyanine, bilirubin and bisbenzimides (Hoechst stains). In certain embodiments, the organic dye is a near-infrared dye, such as, e.g., CY5.5 (GE Healthcare Life Sciences; Pittsburgh, PA), IRDYE 800 (Li-Cor; Lincoln, NE), DYLIGHT 750 (Thermo Fisher Scientific) or indocyanine green (ICG), or a cyanine dye, such as, e.g., cyanine 2, cyanine 3, cyanine 3.5, cyanine 5, cyanine 5.5, cyanine 7. In certain embodiments, the organic dye is a xanthene or sulfonated xanthenes dyes, such as those commercially available under the tradenames ALEXA FLUOR 594, ALEXA FLUOR 633, ALEXA FLUOR 647 and ALEXA FLUOR 700 (Thermo Fisher Scientific). Additional examples of suitable commercially available dyes include ALEXA FLUOR 405, ALEXA FLUOR 488 and ALEXA FLUOR PLUS secondary antibodies (Thermo Fisher Scientific).

The mounted sample can be interrogated directly or can be cured using methods described herein to provide a biological specimen that is embedded in a solidified mountant. Advantageously, the refractive index of the mounted and cured sample matches the RI of the substrate (e.g., microscope slide) and coverslip, and usually exceeds 1.47 and typically ranges from 1.48 to 1.54. For example, the solidified mountant containing the specimen can have a refractive index can range from 1.48 to 1.54 (e.g., 1.48 to 1.50; or 1.50 to 1.52; or 1.52 to 1.54).

Further provided herein are methods of mounting a biological specimen on a substrate. A representative method includes depositing the biological specimen on the substrate and then contacting the biological specimen with the RIM solution to provide a mounted sample. Once mounted, the sample can be interrogated directly (e.g., imaged using a microscope). However, the sample is typically covered (e.g., with a coverslip) for protection during use and subsequent storage. The formulation containing the biological specimen then can be imaged or subsequently dried. Sample drying (also referred to herein as "curing") removes water from the RIM formulation, thereby resulting in hardening of the mountant. For formulations that include a water-soluble polymer, removal of water provides a solidified formulation that is referred to herein as a "hard mountant" or "hard-mount" formulation. It should be appreciated that a hardened mountant still can maintain a certain level of viscosity and/or elasticity, such that it does not become too brittle or cracked.

Depending on the type of formulation and the desired level of curing, the mounted sample can be subjected to a range of different curing regimens. The temperature and time required to cure a particular formulation depends on various factors, including, e.g., the type, molecular weight and concentration of the water-soluble component in the formulation, as well as the desired extent of curing. In addition, the conditions for curing depend on whether the sample is covered with a coverslip or open to the air.

Drying can be conducted at ambient (e.g., room) temperature or at an elevated temperature. In certain embodiments, curing occurs at a temperature below about 40° C. to prevent damage to the biological specimen and/or degradation to the water-soluble components in the formulation. In formulations containing a water-soluble polymer, the polymer can solidify in 24 hours or less; or in some cases 10 hours or less; or even 4 hours or less. In certain formulations including a water-soluble polymer with a molecular weight of 20 kDa or greater, as disclosed herein, drying can be achieved at a temperature below about 40° C. in 4 hours or less in the absence of a coverslip.

The mounting formulations provided herein can be used in various histochemistry, immunochemistry and cytochemistry applications, including, but not limited to mounting of hematological, histological, and cytological samples on microscope slides, including tissue and blood. The described RIM formulations can be used to provide specimens mounted on substrates such as samples of blood, cells, tissue or other biological fluids or materials, including but not limited to, materials that have been stained to facilitate microscopic examination for research and/or diagnostic purposes. A mounted biological specimen prepared according to the methods disclosed herein can be visualized using imaging techniques that are well-known in the art. Imaging can be performed, e.g., using an optical microscope. The high RI and optical clarity of the mounting formulations described herein allow biological samples to be imaged to greater depths (e.g., 100 μm or less; e.g. 1-100 μm) and to higher resolution than when using standard mountants. For example, fluorescently labeled targets are detectable down to 100 μm, and resolution is maintained to a similar depth.

Samples can be prepared using standard ICC/IHC protocols. Additional dehydration in alcohols (e.g., methanol and ethanol) prior to mounting can reduce drying time. Drying in the presence of a desiccant after sample mounting also can speed drying time. The sample can be coated with mountant to cover it and dried without a coverslip. The mounted sample then can be imaged directly without a coverslip or covered with a small volume of glycerol and covered prior to imaging. Any suitable biological sample can be evaluated using the methods disclosed herein, including, but not limited to solution- or suspension-based samples and tissue samples. In certain embodiments, the sample includes cells or a digested cells and fragments thereof. The cells can be dead (e.g., fixed) or live. Additional examples of biological materials that can be treated with the RIM formulations disclosed herein include, a 3D cell culture (spheroid/organoid) or a whole organism (e.g. fruit fly, worm, zebra fish).

The RIM formulations described herein can be used to identify features of different materials, including, without limitation, plant, microbial, animal, earth, blood and plasma samples, and other types of non-living organic and inorganic materials, including but not limited to soil particles and geological samples, without losing clarity, definition or resolution of the objective structures.

In order to identify different components in a cell, stains can be used to provide contrast between particular structures based on their chemical composition. The RIM solutions disclosed herein do not interfere with the fluorescent dyes typically used for staining cells. Thus, in certain embodiments, the biological specimen can be labeled with a fluorescent dye including, but not limited to, those disclosed herein. For example, the sample can include cells that express surface antigens (e.g., cell surface receptors) that can be recognized by and bind to specific affinity molecules (e.g., antibodies). Cells can be treated with a conjugate that includes a fluorophore attached to an affinity molecule (e.g., an antigen) under conditions for binding the antigens on the surface of the cells to the affinity molecule to form a cell labeled with the conjugate. Alternatively, the fluorophore can be contained within the cells, e.g, in the cytoplasm or within an organelle or cellular membrane. Further, RIM formulations provided herein can be used in imaging of stained cells and tissues, and are particularly useful in fluorescent immunohistochemistry (IHC) applications.

A general method of preparing a specimen involves soaking the specimen, which can be optionally stained, in a sufficient quantity of the mounting solution to fully immerse the specimen within the solution. The specimen then is applied to the substrate (e.g., a microscope slide, cuvette, or well). Optionally, the mounted specimen can be dried (e.g. at room temperature up to about 40° C.) until hardened. A cover slip can be applied over the specimen prior to or after hardening of the sample. Cured, mounted samples can be stored indefinitely. Alternatively, the mounted sample can be interrogated, e.g., visualized under a microscope. The mounting formulations are compatible with fluorescent microscopes and objectives, such as epi-fluorescent, wide-field, confocal, stimulated emission depletion (STED) and structured illumination microscopes (SIM). Due to the superior optical properties of the RIM formulation, the specimen appears transparent, allowing visualization of cells and deeper layers of tissues without losing clarity.

The described RIM formulations also are ideally suited for mounting tissue samples on a substrate. Whole tissue mounting and imaging has been challenging to date, because sample thickness, presence of extracellular materials, and reagent penetration can result in background fluorescent and poor image resolution, and decreased imaging depth. The described formulation can decrease the refraction of light as it passes through a coverslip and tissue sample allowing higher resolution and the ability to image to a greater depth. Because the disclosed formulations improve sample transparency, they are particularly advantageous for use with tissue samples.

A representative method is provided for mounting a tissue sample on a microscope slide using a RIM formulation, as described herein. The tissue can be a sectioned or whole sample that can be fixed or unfixed. In general, the tissue sample is deposited onto the surface of a microscope slide and a RIM formulation, as disclosed herein, is applied to the sample. The mounted sample then is dried to remove excess water, such that the formulation solidifies. The amount of the mounting medium used in the method can vary but is generally chosen to wet the surface of the tissue. Excess mounting medium can be removed using known methods, if desired. Once mounted onto the slide surface, the mounted sample can be dried, with or without the application of heat (e.g., at room temperature or at an elevated temperature). Drying can be accelerated by using a vacuum pump and/or desiccant. Once dried, the tissue firmly adheres to the slide and the sample will be embedded within the mountant. If needed, an additional amount of the formulation can be added, and the drying process can be repeated.

Further provided herein are kits for mounting a biological sample to a substrate for subsequent imaging and/or storage of the sample. Thus, in yet another aspect, a kit for mounting a biological specimen on a substrate is provided that includes a refractive index matching (RIM) solution, as disclosed herein; and instructions for mounting a biological specimen on the substrate. Additional components optionally can be included in the kit, including, e.g., a co-mountant, such as glycerol.

The following examples are included to demonstrate certain embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

The examples provided herein utilize the following general methods unless indicated otherwise. Refractive indices of all mountant formulations before and after drying were measured with an ABBE-3L Refractometer (Thermo Fisher Scientific) equipped with a lamp operating wavelength sodium D line (589.3 nm). Molecular weights of poly(N-methyl methacrylamide) (PMMAm) are reported as weight average molecular weight ($M_w$), as measured by standard gel permeation chromatography (GPC) methods using 5 mM LiBr methanol/dimethylformamide (50/50 v/v %) as an eluent, TSkgel® $H_{Hr}$ organic size exclusion columns (TOSOH Bioscience LLC, King of Prussia, PA) with Wyatt Technology Corporation's miniDAWN® TREOS® multiangle light scattering (MALS) and Optilab® T-rEX differential refractometer detectors (Santa Barbara, CA).

Example 1

Measuring Refractive Indices of Mountant Samples

Refractive index measurements on dried samples were measured by carefully spreading 300 μL of sample onto the refractometer prism and then allowing the mountant to dry up to 24 hours. Refractive index was measured once the mountant solution was dried into a transparent film.

Example 2

Mounting Procedure

Biological specimens (e.g., cultured monolayer cells and tissue sections with thickness of less than 30 μm) are mounted onto a substrate by applying a sufficient amount of mountant, typically 1 to 3 drops (30 to 100 μL), to a specimen disposed on a substrate until fully covered or immersed. The biological specimen can be unstained or can be stained prior to mounting using procedures well known to those in the art. The specimen then is covered with an 18 mm×18 mm coverslip and any excess mountant is wiped or pipetted away from the edges of the coverslip. The mounted specimen is allowed to dry for 24-96 hours at room temperature, although temperatures as high as 40° C. are acceptable. After the mounted specimen is completely dried, the specimen can be imaged using fluorescent microscopy techniques that are well known to the person skilled in the art. Alternatively, the mounted specimen can be dried prior to applying a coverslip. Drying without a coverslip can accelerate the drying of the hard set mountant. Without a coverslip, drying can take about 30 minutes at 40° C. to about 4 hours at room temperature. After the mountant is dry, a coverslip can be applied over the mounted specimen by placing a contact liquid such as water, more mountant, ethanol or glycerol on the dried mountant and then placing a coverslip over the specimen.

The following protocol can be used for mounting biological specimens that are 30-100 μm and thicker. Allow the mountant to warm to room temperature for 2 hours before mounting coverslips. Remove excess liquid from the sample by gently tapping the edge of the coverslip or slide on a laboratory wipe. For slide-mounted specimens, apply 2-3 drops or 60-100 μL of the mountant directly to the specimen, then carefully lower a coverslip onto the mountant to avoid trapping any air bubbles. For specimens stained in well plates or culture dishes, carefully move sample to a microscope slide. The addition of 10 μL of mountant to the slide can assist with manipulating the sample into place. For 3-D cultured cells or spheroids, move 3-D cultures or spheroids to a microscope slide using a 1 mL pipette with the end of the tip removed. Place the 3-D culture with buffer on a microscope slide prepared with an appropriate spacer to ensure integrity of the sample. The spacer should allow sufficient room for the sample while minimizing the volume of mountant required. Spacers allowing open edges decrease the curing time of the sample. If needed, gently tap the coverslip to remove air bubbles. If the mountant does not fill out to the edges of the coverslip, apply additional mountant under the coverslip using a pipette. Gently tap to remove air bubbles from around the sample. Failure to sufficiently cover the sample can lead to mountant contraction and reduce the imaging area. Place the mounted sample on a flat, dry surface, and allow it to cure at room temperature in the dark. For optimal results, allow sample to cure for at least 48 hours.

Specimens 30-100 µm and thicker can be cured more quickly using the following protocol. Allow the mountant to warm to room temperature for 2 hours before mounting coverslips. Remove excess liquid from the sample by gently tapping the edge of the coverslip or slide on a laboratory wipe. For slide-mounted specimens, apply 2-3 drops or 60-100 µL of the mountant directly to the specimen. Carefully tilt the slide back-and-forth to distribute the mountant evenly over the specimen. Aim to spread 2-3 drops or 60-100 µL of mountant over an area of 18 mm×18 mm. The edge of a pipette tip can be used to gently assist in removing any bubbles and spreading the mountant. For specimens stained in well plates or culture dishes, carefully move the sample to a microscope slide. The addition of 10 µL of mountant to the slide can assist with manipulating the sample into place. For 3-D cultured cells or spheroids, move 3-D cultures or spheroids to a microscope slide using a 1-mL pipette with the end of the tip removed. Place the 3-D culture with buffer on a microscope slide prepared with an appropriate spacer to ensure integrity of the sample. The spacer should allow sufficient room for the sample while minimizing the volume of mountant required. Remove excess buffer from the culture, then apply 2-3 drops or 60-100 µL of the mountant directly to the specimen depending on the spacer height and surface area. Do not apply a coverslip at this point. Allow the sample to cure without a coverslip for 16-24 hours at room temperature, protected from light. After 16-24 hours, apply 10 µL of glycerol across the top of the cured mountant and specimen. Apply a coverslip and press into place, tapping to remove bubbles, if present. Allow the coverslip to cure into place for 1-3 hours or until the coverslip no longer moves.

Example 3

Formulation of Mounting Media with Polyvinyl Pyrrolidone (PVP)

Mounting media was formulated by adding 0.50 g of glycerol (Fisher Scientific, Fair Lawn, NJ), 1.00 g of PVP ($M_w$=55,000 g/mol; TCI America Portland, OR), 61 mg of 2-amino-2-(hydroxymethyl)-1,3,propanediol (TRIS base; Sigma-Aldrich, St. Louis, MO) and 3.8 mL of deionized water to a 20 mL scintillation vial equipped with a magnetic stir bar. The solution was stirred at 500 rpm in a water bath at 60° C. and heated until complete dissolution of PVP was observed. After dissolution of the polymer, the vial was allowed to cool to room temperature prior to use. The RI was measured as described in Example 1 (see, Table 1, Sample 2).

Example 4

Formulation of Mounting Media with Polyvinyl Alcohol (PVA)

Mounting media was formulated by adding 0.50 g of glycerol, 61 mg of TRIS base, 1.00 g of PVA ($M_w$~23,000 g/mol; Sekisui America Corporation, Secaucus, NJ, USA) and 3.8 mL of deionized water to a 20 mL scintillation vial equipped with a magnetic stir bar. The solution was stirred and heated as described in Example 3 until complete dissolution of PVA was observed. After dissolution of the polymer the vial was allowed to cool to room temperature prior to use. The RI was measured as described in Example 1 (see, Table 1, Sample 8).

Example 5

Formulation of Mounting Media with Poly(N-Methyl Methacrylamide) (PMMAm)

Mounting media was formulated by adding 0.50 g of glycerol, 61 mg of TRIS base, 1.00 g of PMMAm ($M_w$=100,000 g/mol) and 3.8 mL of deionized water to a 20 mL scintillation vial equipped with a magnetic stir bar. The solution was stirred and heated as described in Example 3 until complete dissolution of PMMAm was observed. After dissolution of the polymer the vial was allowed to cool to room temperature prior to use. The RI was measured as described in Example 1 (see, Table 1, Sample 14).

Example 6

Formulation of Mounting Media with Varying Polymer/Glycerol Weight Ratios

Mounting media were formulated using PVP, PVA and PMMAm as the water-soluble polymer, as described in Examples 3-5. In addition, the weight ratio of polymer to glycerol was varied from 0.5 to 2.0. The final volume of the mountant was diluted with DI water to a constant volume of 5 mL. The solution was stirred and heated as described in Example 3 until complete dissolution of the polymer was observed. After dissolution of the polymer, the vial was allowed to cool to room temperature prior to use. The RI's were measured as described in Example 1 (see, Table 1, Samples 1, 2, 3 and 4 for PVP; Samples 7, 8 and 10 for PVA; and Samples 14, 15, 17, 18 and 20 for PMMAm). Referring to the data for Samples 1, 2, 3, 4, 7, 8, 10, 14, 15, 17, 18 and 20 in Table 1, the RI of the dried mounting media increased significantly as the ratio of polymer to glycerol increased, which was expected because the RIs of the tested polymers reported in the literature (i.e., 1.530 PVP; 1.50 PVA; and 1.540 PMMAm) exceed that of pure glycerol (1.4722@25° C.). However, it was found that once the polymer concentration exceeds a certain threshold value, the physical and optical properties of the dried mountant degrade considerably and, depending on the polymer, can even result in a film that becomes unusable for microscopy applications (see, e.g., Sample 23). However, too much polyol in a formulation can result in a dried material that is greasy or oily and the coverslip will not adhere well to the sample. For certain polymers this threshold value is about 0.125:1 or greater (e.g., PVP and PVA), and only minute quantities of polymer are required to produce a useable, high RIM film. For other polymers, however, too much polymer in the formulation can lead to poor film quality and have other disadvantages. For formulations implementing PMMAm, for example, the presence of some polyol in the formulation helps to plasticize the polymer, so that it does not become too brittle or crack, especially when stored at lower temperatures. Thus, for PMMAm-based formulations, the weight ratio of the water-soluble polymer to the polyol is about 4:1 or less (e.g., 0.125:1 to 4:1). Regardless of polymer type, polyol also can impart some level of permanent volume to the dried mountant and can prevent the biological sample (e.g, cells) from compressing too much. For example, even though PVA films without polyol do not typically crack upon drying, the film shrinks so much that the cells become compressed.

Example 7

Formulation of Mounting Media with Varying Polymer/Diglycerol Weight Ratios

Mounting media was formulated as described in Example 6 with the exception that diglycerol (Alfa Aesar, Tewksbury, MA) was used in place of glycerol as the polyol. The weight ratios of polymer to diglycerol were varied from 0.5 to 2.0. The final volume of the mountant was diluted with DI water to a constant volume of 5 mL. The solution was stirred and heated as described in Example 3 until complete dissolution of polymer was observed. After dissolution of the polymer the vial was allowed to cool to room temperature prior to use. The RIs were measured according to the procedure described in Example 1 (see, Table 1, Samples 5 and 6 for PVP; Samples 9, 11 and 12 for PVA; and Samples 13, 16, and 19 for PMMMAm). Referring to Table 1, the RI of the dried mounting media increased as the ratio of polymer to diglycerol increased, because the RIs of the tested polymers exceed that for pure diglycerol (1.4850@20° C.). In addition, mounting media prepared with diglycerol had slightly higher RIs than when prepared using glycerol.

Example 8

Formulation of Mounting Media with Varying Polymer Molecular Weight

Mounting media were formulated as described in Examples 3-5 with the exception that the weight of the polymer was varied as follows: PVP (10,000 g/mol to 55,000 g/mol); PVA (13,000 g/mol to 31 000 g/mol); and PMMAm (33,000 g/mol to 100,000 g/mol). The weight ratios of polymer to polyol were varied from 0.5 to 2.0. The final volume of the mountant was diluted with DI water to a constant volume of 5 mL. The solution was stirred and heated as described in Example 3 until complete dissolution of polymer was observed. After dissolution of the polymer, the vial was allowed to cool to room temperature prior to use. The RIs were measured according to the procedure described in Example 1 (see, Table 1, Samples 1-6 for PVP; Samples 7-12 for PVA; and Samples 13-20 for PMMMAm). Interestingly, the molecular weight of the polymer had no statistically significant effect on the RI when the polyol type and polymer to polyol ratio were held constant.

Example 9

Formulation of Mounting Media with Polymer Only

Mounting media was formulated as described in Examples 3-5 with the exception that glycerol or diglycerol additive were omitted from the formulations. The final volume of the mountant was diluted with DI water to a volume of 5 mL. The solution was stirred and heated as described in Example 3 until complete dissolution of polymer was observed. After dissolution of the polymer the vial was allowed to cool to room temperature prior to use. The RI's were measured according to the procedure described in Example 1 (see, Table 1, Samples 21-23). The RI of Sample 23 was not measurable (NM) due to the cracking of the dried mountant. The data for samples absent glycerol or diglycerol indicate that the presence of a polyol in the formulation can prevent the film from becoming too brittle or shrinking too much, likely because that the polyol plasticizes or softens the dried polymer film.

TABLE 1

| | | | | Polymer Weight | |
| | | | Polymer/Polyol | Average Molecular | Refractive |
| | | | Weight Ratio | Weight ($M_w$) | Index |
| Sample | Polymer | Polyol | (g/g) | (g/mol) (×1000) | @ 21° C. |
|---|---|---|---|---|---|
| | | Refractive indices of various mountant formulations upon drying for 24 h at room temperature | | | |
| 1 | PVP | Glycerol | 2 | 10 | 1.5037 |
| 2 | PVP | Glycerol | 2 | 55 | 1.5000 |
| 3 | PVP | Glycerol | 0.5 | 40 | 1.4757 |
| 4 | PVP | Glycerol | 1 | 10 | 1.4830 |
| 5 | PVP | Diglycerol | 0.5 | 55 | 1.4797 |
| 6 | PVP | Diglycerol | 2 | 40 | 1.5090 |
| 7 | PVA | Glycerol | 2 | 13 | 1.4937 |
| 8 | PVA | Glycerol | 2 | 23 | 1.4927 |
| 9 | PVA | Diglycerol | 2 | 31 | 1.4992 |
| 10 | PVA | Glycerol | 0.5 | 31 | 1.4687 |
| 11 | PVA | Diglycerol | 0.5 | 13 | 1.4712 |
| 12 | PVA | Diglycerol | 2 | 23 | 1.4988 |
| 13 | PMMAm | Diglycerol | 2 | 33 | 1.5172 |
| 14 | PMMAm | Glycerol | 2 | 100 | 1.5154 |
| 15 | PMMAm | Glycerol | 1 | 33 | 1.4972 |
| 16 | PMMAm | Diglycerol | 2 | 100 | 1.5192 |
| 17 | PMMAm | Glycerol | 0.5 | 33 | 1.4813 |
| 18 | PMMAm | Glycerol | 2 | 66 | 1.5132 |
| 19 | PMMAm | Diglycerol | 0.5 | 66 | 1.4823 |
| 20 | PMMAm | Glycerol | 2 | 33 | 1.5134 |
| 21 | PVP | None | N/A | 40 | 1.5158 |
| 22 | PVA | None | N/A | 23 | 1.4986 |
| 23 | PMMAm | None | N/A | 66 | NM |

Example 10

Formulation of Mounting Media with Polymer and Antifade Reagent

Mounting media was formulated by adding 0.55 g of diglycerol, 1.10 g of PMMAm ($M_w$=60,000 g/mol), 122 mg of 2-amino-2-(hydroxymethyl)-1,3,propanediol (TRIS base) and 5.0 mL of deionized water to a 20 mL scintillation vial equipped with a magnetic stir bar. The solution was stirred and heated as described in Example 3 until complete dissolution of PMMAm was observed. After complete dissolution of the polymer, 9.7 mg of benzoic acid (7.94 mmol) and 19 mg of sodium sulfite (15 mmol) were added as a preservative and antifade reagent, respectively. The solution was stirred for an additional 30 minutes at 60° C. until all the benzoic acid was dissolved. Once dissolved, the vial was cooled to room temperature and the volume was diluted up to 10 mL with DI water. The RI was measured according to the procedure described in Example 1 (RI=1.5146@21° C. after 24 h). The RI value for this formulation is most similar to Sample 18 or Sample 13 presented in Table 1. Example 8 indicates that MW does not statistically influence RI values and that the use of diglycerol versus glycerol slightly increases RI values. In comparison to Sample 13 and Sample 18, an RI value of 1.5146 for the current sample suggests that the addition of antifade and preservative reagents have a negligible effect, if any, on the final RI value.

Example 11

Refractive Index Measurements Over Time

Refractive indices were monitored over a 5 day period to track the change in RI as a function of time. Various mounting formulations were evaluated as described in Example 1, and measurements were repeated at various time points over a 5 day period. The refractive index increased dramatically over the first 5 h and then plateaued and remained similar after 24 h (see, FIG. 1 for Sample 8 and 13).

Example 12

Mounting Sub-Micron Fluorescent Microspheres for Axial Resolution Measurements Using Confocal Microscopy The axial resolution at various focal depths for mounting formulations disclosed herein is detected with a confocal microscope using the point spread function of sub-resolution fluorescent microspheres. 1.7 μL of 175 nm green fluorescent microspheres (505/515 excitation/emission) from a PS-Speck™ Microscope Point Source Kit (Thermo Fisher Scientific, Waltham, MA) are dispersed in 200 μL of mountant sample and then sonicated for 20 minutes. After sonication, 100 μL of each sample is pipetted onto ethanol cleaned 18 mm by 18 mm coverslips and spread over the entire area by tilting the coverslips back and forth with forceps. The mounting media samples were dried on the coverslips for 1 h at 40° C. Once dried, coverslips were immobilized onto standard microscope slides by placing 10 μL of glycerol onto the slides and then gently placing each coverslip onto the glycerol droplet. Coverslips were allowed to immobilize on the slide for ~20 minutes at room temperature.

Figure 2:
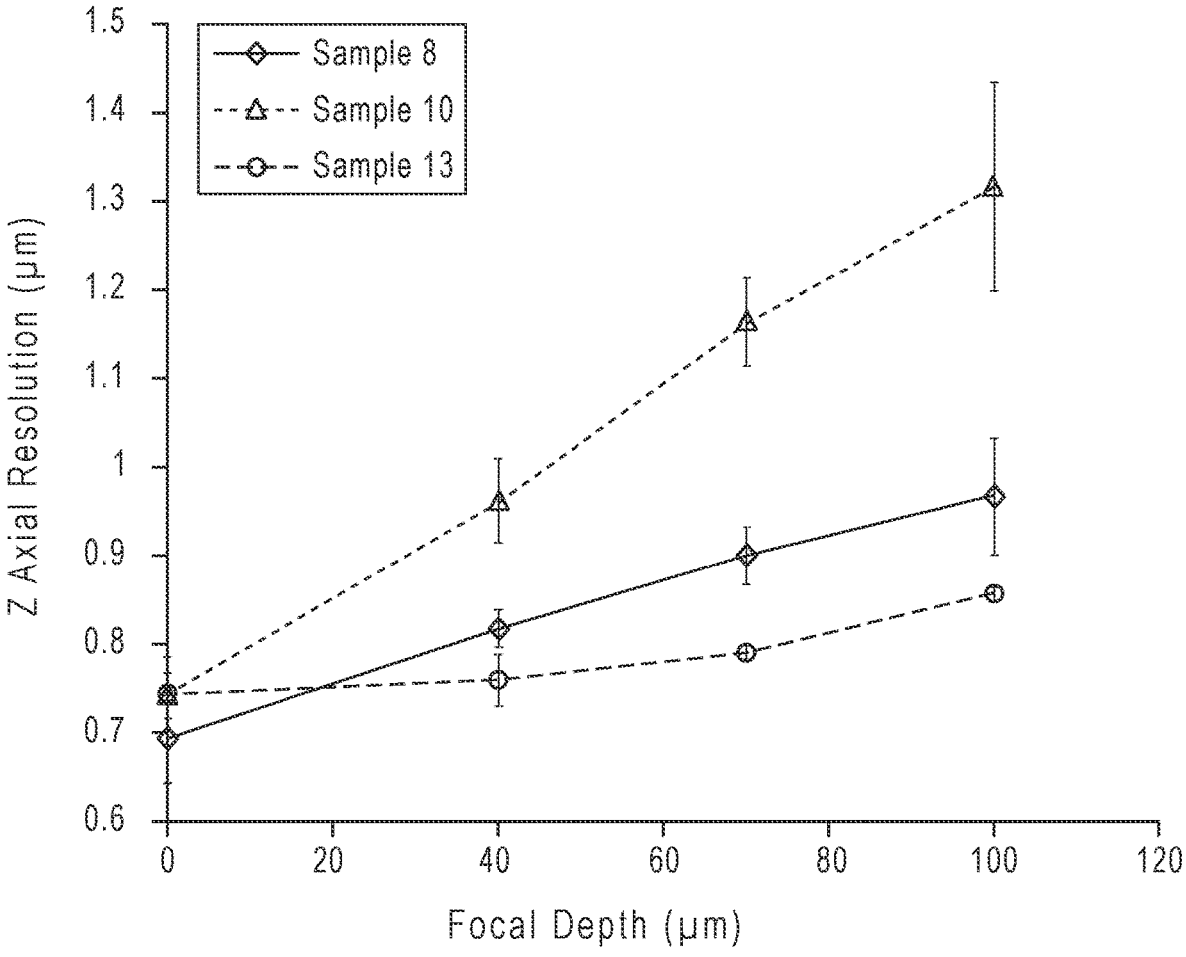
FIG. 2. is a plot showing axial resolution as a function of focal depth for Sample 8, 10 and 13.
Figure 3:
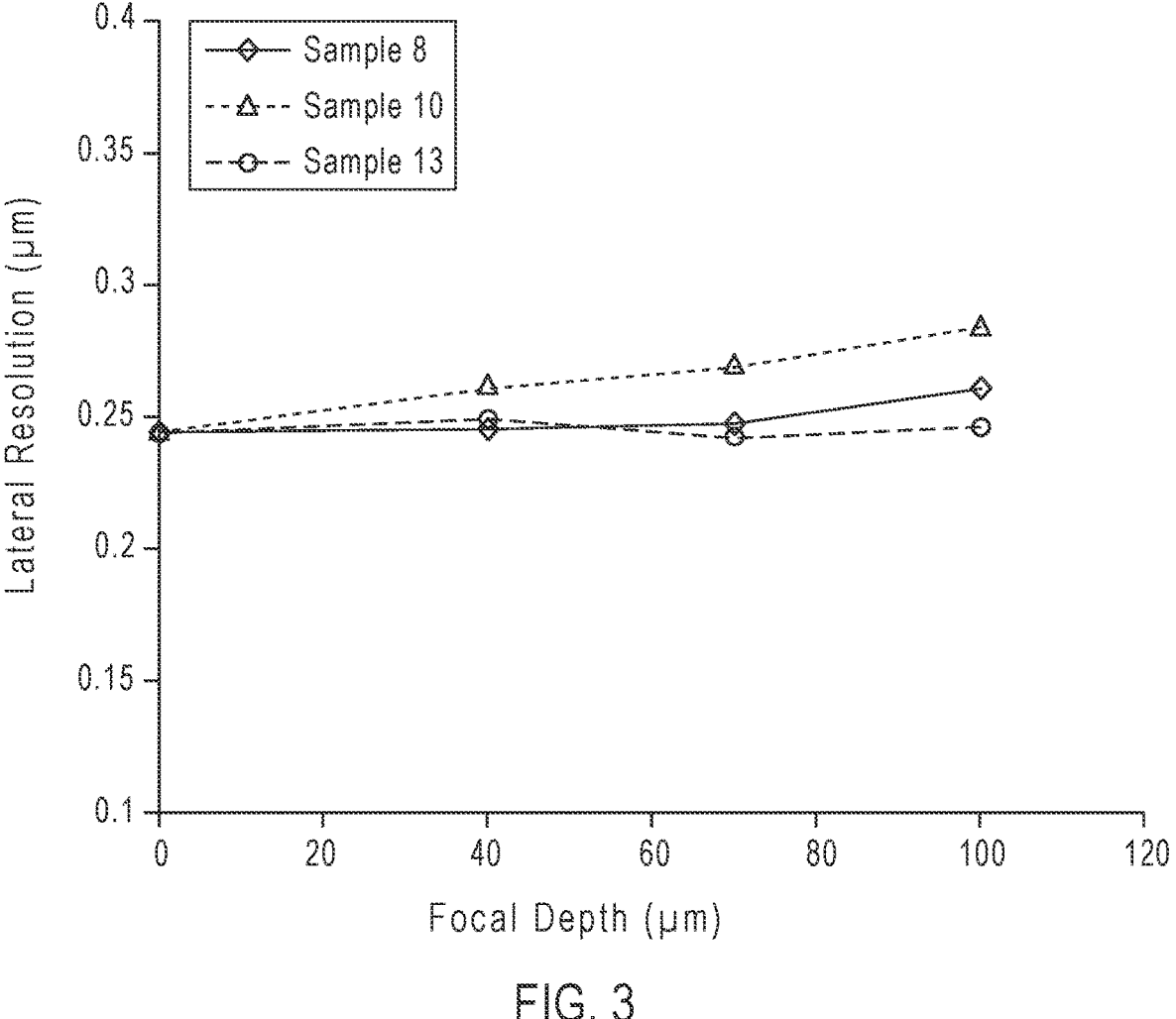
FIG. 3. is a plot showing lateral resolution as a function of focal depth for Sample 8, 10 and 13.

Axial and lateral resolutions for each sample were determined by confocal microscopy. Z-stacks of individual microspheres were collected on a Zeiss™ LSM 710 confocal microscope using a Plan-Apochromat 63×/1.4 NA Oil objective, sampling at a rate of 42 nm in x, y and 100 nm in the z dimensions. Prior to imaging each sample, the objective was first covered with Carl Zeiss Immersol™ 518F immersion oil (Carl Zeiss, Inc., Thornwood, NY) having a RI of 1.518 (measured with an e-line (546 nm) at 23° C.). For each sample, embedded microspheres were imaged at focal depths ranging from the coverslip down to 100 μm. Three microspheres were imaged at every focal depth for each sample at different locations across the entire area of the mounted sample (i.e. left, center and right). Axial (z) and lateral (x, y) resolutions for each sample were calculated using the ImageJ MetroloJ plugin. Plotted data (FIG. 2 and FIG. 3) shows axial and lateral resolutions as a function of focal depth for Sample 8, 10 and 13. As seen in FIG. 2, axial resolution is improved (i.e lower values) the closer the RI is to the RI of immersion oil. Improved axial resolution follows Sample 13 (1.5172)>Sample 8 (1.4927)>Sample 10 (1.4687), where Sample 13 has 1.54 times improved axial resolution in contrast to Sample 10 at a 100 μm focal depth. As expected, there is little to no difference in lateral resolution between each sample at each focal depth (FIG. 3). Tuning of the RI to achieve maximal axial resolution, while maintaining integrity of the dried mounting media, through the manipulation of the polymer type and polymer/polyol ratio to match that of the RI of immersion oil is demonstrated in this Example.

All of the U.S. patents, U.S. patent application publications, U.S. patent applications, foreign patents, foreign patent applications and non-patent publications referred to in this specification are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following clauses and claims, the terms used should not be construed to limit the clauses and claims to the specific embodiments disclosed in the specification and the claims, but should be construed to include all possible embodiments along with the full scope of equivalents to which such clauses and claims are entitled. Accordingly, the clauses and claims are not limited by the disclosure. Embodiments may be in accordance with following numbered clauses:

1. A refractive index matching (RIM) solution, comprising:
   a) a water-soluble polymer, wherein the polymer has a molar refraction ($R_{LL}$) to molar volume ($V_m$) ratio of 0.27 to 0.34;
   b) a polyol, wherein the weight ratio of the water-soluble polymer to the polyol is 0.318:1 to 4:1; and
   c) water or a buffer, wherein the RIM solution has a refractive index of 1.36 or greater.

2. The RIM solution of clause 1, wherein the refractive index is 1.60 or less.

3. A method of mounting a biological specimen on a substrate, comprising:
   depositing the biological specimen on the substrate; and
   contacting the biological specimen with the RIM solution of clause 1 or clause 2 to provide a mounted sample.

4. The method of clause 3, further comprising drying the mounted sample, whereby the water-soluble polymer solidifies to provide a solidified polymer.

5. The method of clause 4, wherein the water-soluble polymer solidifies in about 48 hours or less at room temperature; or 24 hours or less at room temperature; or in about 4 hours or less at a temperature of about 40° C.

6. The method of clause 4, wherein the refractive index of the solidified polymer exceeds 1.47 (e.g., 1.48 to 1.54; or 1.50 to 1.525).

7. The method of any one of the preceding clauses, further comprising visualizing the biological specimen on the substrate with a microscope.

8. A solidified mountant, comprising a water-soluble polymer, wherein the polymer has a molar refraction ($R_{LL}$) to molar volume ($V_m$) ratio of 0.27 to 0.34, and a polyol, wherein the weight ratio of the water-soluble polymer to the polyol is 0.318:1 to 4:1, and wherein the solidified mountant has a refractive index of 1.48 or greater.

9. The solidified mountant of clause 8, wherein the weight ratio of the water-soluble polymer to the polyol is 0.5:1 or greater.

10. The solidified mountant of clause 8 or 9, wherein the refractive index is greater than 1.47.

11. The RIM solution or solidified mountant of any one of the preceding clauses, wherein the water-soluble polymer is uncharged.

12. The RIM solution of clause 11, wherein the uncharged, water-soluble polymer is a poly(acrylamide), poly(methacrylamide), poly(methyl vinyl ether), poly(vinyl pyrrolidone) (PVP), polyvinyl alcohol (PVA), poly(2-ethyl-2-oxazoline), or poly(2-methyl-2-oxazoline).

13. The RIM solution of clause 11, wherein the uncharged, water-soluble polymer comprises a monomer residue of N—R acrylamide or N—R methacrylamide, wherein R is methyl, ethyl, propyl, isopropyl or H; N,N-dimethylacrylamide, N,N-dimethylmethacrylamide, N,N-diethylacrylamide, N, N diethylmethacrylamide; N-2-hydroxypropyl methacrylamide); or a combination thereof.

14. The RIM solution or solidified mountant of clause 11, wherein the uncharged, water-soluble polymer is poly(N-methyl methacrylamide) (PMMAm).

15. The RIM solution or solidified mountant of any one of the preceding clauses, wherein the water-soluble polymer is charged.

16. The RIM solution or solidified mountant of clause 15, wherein the charged, water-soluble polymer is polyacrylic acid, polymethacrylic acid, poly(diallyldimethylammonium chloride), poly(sodium-4-styrenesulfonate), poly(ethyleneimine), poly(N,N-dimethylaminoethyl acrylate), poly(N,N-diethylethylamino acrylate), poly(allylamine), poly[bis(2-chloroethyl)ether-co-1,3-bis[3-(dimethylamino)propyl] urea], or poly(vinylsulfonic acid, sodium salt).

17. The RIM solution or solidified mountant of any one of the preceding clauses, wherein the water-soluble polymer has a weight average molecular weight of about 1 kDa to about 100 kDa.

18. The RIM solution or solidified mountant of any one of the preceding clauses, wherein the water-soluble polymer has a weight average molecular weight of about 1 kDa to about 20 kDa.

19. The RIM solution or solidified mountant of any one of the preceding clauses, wherein the water-soluble polymer has a weight average molecular weight of about 20 kDa to about 100 kDa.

20. The RIM solution or solidified mountant of any one of the preceding clauses, wherein the water-soluble polymer has a weight average molecular weight of about 48 kDa to about 80 kDa.

21. The RIM solution or solidified mountant of any one of the preceding clauses, wherein the refractive index is 1.48-1.50; or 1.50 to 1.52; or 1.52 to 1.54.

22. The RIM solution or solidified mountant of any one of the preceding clauses, wherein the refractive index of the RIM solution or solidified mountant matches the refractive index of soda-lime glass, borosilicate glass, or immersion oil.

23. The RIM solution or solidified mountant of any one of the preceding clauses, wherein the water-soluble polymer is not a polyol.

24. The RIM solution or solidified mountant of any one of the preceding clauses, wherein the polyol is polyvinyl alcohol, glycerol, diglycerol, polyglycerol, mannitol, sorbitol, thiodiethanol, thiodipropanol, or a combination thereof.

25. The RIM solution or solidified mountant of any one of the preceding clauses, further comprising an anti-oxidant.

26. The RIM solution or solidified mountant of clause 25, comprising 1% by weight or less of the anti-oxidant.

27. The RIM solution of clause 26, wherein the anti-oxidant is 6-hydroxy-2,5,7,8-tetramethylchroman-2-carboxylic acid, 3-carboxy proxyl, hydroquinone, mequinol, sodium sulfite, sodium erythorbate, ascorbic acid, propyl gallate, caffeic acid, paraphenylenediamine, 1,4-diazabicyclo[2.2.2]octane, or a combination thereof.

28. A mounted biological specimen, comprising a biological specimen disposed on a substrate, wherein the biological specimen is embedded in the solidified mountant of any one of the preceding clauses.

29. A kit for mounting a biological specimen on a substrate, comprising:
  a) the refractive index matching (RIM) solution of any one of the preceding clauses; and
  b) instructions for mounting the biological specimen on the substrate.

30. The method, mounted biological specimen or kit of any one of the preceding clauses, wherein the substrate is a microscope slide, cuvette, well or dish.

31. The method, mounted biological specimen or kit of any one of the preceding clauses, wherein the biological specimen is a cell, tissue, 3D cell culture (e.g., spheroid/organoid), or a whole organism (e.g. fruit fly, worm, zebra fish).

32. The method, mounted biological specimen or kit of any one of the preceding clauses, wherein the biological specimen is labeled with a fluorescent dye or fluorescent protein.

What is claimed is:

1. A refractive index matching (RIM) solution, comprising:
  a) a water-soluble polymer, wherein the water-soluble polymer is (i) a charged water-soluble polymer; (ii) an uncharged, water-soluble polymer that comprises a monomer residue of N—R acrylamide or N—R methacrylamide, wherein R is methyl, ethyl, propyl, isopropyl or H, N,N-dimethylacrylamide, N,N-dimethylmethacrylamide, N,N-diethylacrylamide, N, N-diethylmethacrylamide, N-2-hydroxypropyl methacrylamide, or a combination thereof; or (iii) poly(methyl vinyl ether), poly(2-ethyl-2-oxazoline), poly(2-methyl-2-oxazoline), poly(vinyl pyrrolidone) (PVP), or polyvinyl alcohol (PVA);
  b) a polyol, wherein the polyol is polyvinyl alcohol, glycerol, diglycerol, polyglycerol, mannitol, sorbitol, erythritol, thiodiethanol, thiodipropanol, or a combination thereof, and wherein the weight ratio of the water-soluble polymer to the polyol is 0.125:1 to 4:1, wherein the water-soluble polymer and polyol are different; and
  c) water or a buffer, wherein the RIM solution has a refractive index of about 1.36 to about 1.60.

2. The RIM solution of claim 1, wherein the water-soluble polymer has a molar refraction ($R_{LL}$) to molar volume ($V_m$) ratio of about 0.27 to about 0.34.

3. The RIM solution of claim 1, wherein the uncharged, water-soluble polymer is poly(N-methyl methacrylamide) (PMMAm), poly(acrylamide), or poly(methacrylamide).

4. The RIM solution of claim 1, wherein the charged, water-soluble polymer is polyacrylic acid, polymethacrylic acid, poly(diallyldimethylammonium chloride), poly(sodium-4-styrenesulfonate), poly(ethyleneimine), poly(N,N-dimethylaminoethyl acrylate), poly(N,N-diethylethylamino acrylate), poly(allylamine), poly[bis(2-chloroethyl)ether-co-1,3-bis[3-(dimethylamino)propyl]urea], or poly(vinylsulfonic acid, sodium salt).

5. The RIM solution of claim 1, further comprising an anti-oxidant.

6. The RIM solution of claim 5, wherein the anti-oxidant is 6-hydroxy-2,5,7,8-tetramethylchroman-2-carboxylic acid, 3-carboxy proxyl, hydroquinone, mequinol, sodium sulfite, sodium erythorbate, ascorbic acid, propyl gallate, caffeic acid, paraphenylenediamine, 1,4-diazabicyclo[2.2.2]octane, or a combination thereof.

7. A method of mounting a biological specimen on a substrate, comprising:

depositing the biological specimen on the substrate;

contacting the biological specimen with a refractive index matching (RIM) solution to provide a mounted sample, wherein the RIM solution comprises:

a) a water-soluble polymer, wherein the water-soluble polymer is (i) a charged water-soluble polymer; (ii) an uncharged, water-soluble polymer that comprises a monomer residue of N—R acrylamide or N—R methacrylamide, wherein R is methyl, ethyl, propyl, isopropyl or H, N,N-dimethylacrylamide, N,N-dimethylmethacrylamide, N,N-diethylacrylamide, N, N-diethylmethacrylamide, N-2-hydroxypropyl methacrylamide, or a combination thereof; or (iii) poly(methyl vinyl ether), poly(2-ethyl-2-oxazoline), poly(2-methyl-2-oxazoline), poly(vinyl pyrrolidone) (PVP), or polyvinyl alcohol (PVA), b) a polyol, wherein the weight ratio of the water-soluble polymer to the polyol is 0.125:1 to 4:1, wherein the water-soluble polymer and polyol are different, and c) water or a buffer, wherein the RIM solution has a refractive index of about 1.36 to about 1.60; and drying the mounted sample at room temperature to about 40° C. for about 48 hours or less to provide a solidified mountant.

8. The method of claim 7, wherein the RIM solution solidifies in about 24 hours or less at room temperature.

9. The method of claim 7, wherein the RIM solution solidifies in about 4 hours or less at a temperature of about 40° C.

10. A solidified mountant, comprising a water-soluble polymer, and a polyol, wherein the weight ratio of the water-soluble polymer to the polyol is 0.125:1 to 4:1, wherein the water-soluble polymer is (i) a charged water-soluble polymer; (ii) an uncharged, water-soluble polymer that comprises a monomer residue of N—R acrylamide or N—R methacrylamide, wherein R is methyl, ethyl, propyl, isopropyl or H, N,N-dimethylacrylamide, N,N-dimethylmethacrylamide, N,N-diethylacrylamide, N, N-diethylmethacrylamide, N-2-hydroxypropyl methacrylamide, or a combination thereof; or (iii) poly(methyl vinyl ether), poly(2-ethyl-2-oxazoline), poly(2-methyl-2-oxazoline), poly(vinyl pyrrolidone) (PVP), or polyvinyl alcohol (PVA), wherein the solidified mountant has a refractive index of about 1.48 to about 1.60 and wherein the water-soluble polymer and polyol are different.

11. The solidified mountant of claim 10, wherein the polymer has a molar refraction ($R_{LL}$) to molar volume ($V_m$) ratio of about 0.27 to about 0.34.

12. The solidified mountant of claim 10, wherein the refractive index of the solidified mountant matches the refractive index of soda-lime glass, borosilicate glass, or immersion oil.

13. The solidified mountant of claim 10, wherein the uncharged, water-soluble polymer is poly(N-methyl methacrylamide) (PMMAm), poly(acrylamide), or poly(methacrylamide).

14. The solidified mountant of claim 10, wherein the charged, water-soluble polymer is polyacrylic acid, polymethacrylic acid, poly(diallyldimethylammonium chloride), poly(sodium-4-styrenesulfonate), poly(ethyleneimine), poly(N,N-dimethylaminoethyl acrylate), poly(N,N-diethylethylamino acrylate), poly(allylamine), poly[bis(2-chloroethyl)ether-co-1,3-bis[3-(dimethylamino)propyl]urea], or poly(vinylsulfonic acid, sodium salt).

15. The solidified mountant of claim 10, wherein the polyol is polyvinyl alcohol, glycerol, diglycerol, polyglycerol, mannitol, sorbitol, erythritol, thiodiethanol, thiodipropanol, or a combination thereof.

16. The solidified mountant of claim 10, wherein the RIM solution further comprises an anti-oxidant.

17. A mounted biological specimen, comprising a biological specimen disposed on a substrate, wherein the biological specimen is embedded in the solidified mountant of claim 10.

* * * * *